W. W. Dutcher,
Loom-Temple.

No. 107,168.      Patented Sep. 6, 1870.

Witnesses:
S. N. Piper
J. R. Snow

Warren W. Dutcher
by his Attorney
R. H. Eddy

United States Patent Office.

WARREN W. DUTCHER, OF HOPEDALE, MASSACHUSETTS, ASSIGNOR TO THE DUTCHER TEMPLE COMPANY, OF SAME PLACE.

*Letters Patent No. 107,168, dated September 6, 1870.*

IMPROVEMENT IN LOOM-TEMPLE.

The Schedule referred to in these Letters Patent and making part of the same.

*To all persons to whom these presents may come:*

Be it known that I, WARREN W. DUTCHER, of Hopedale, of the county of Worcester and State of Massachusetts, have invented an Improved Loom-Temple; and do hereby declare the same to be fully described in the following specification, and represented in the accompanying drawing, of which—

Figure 2:
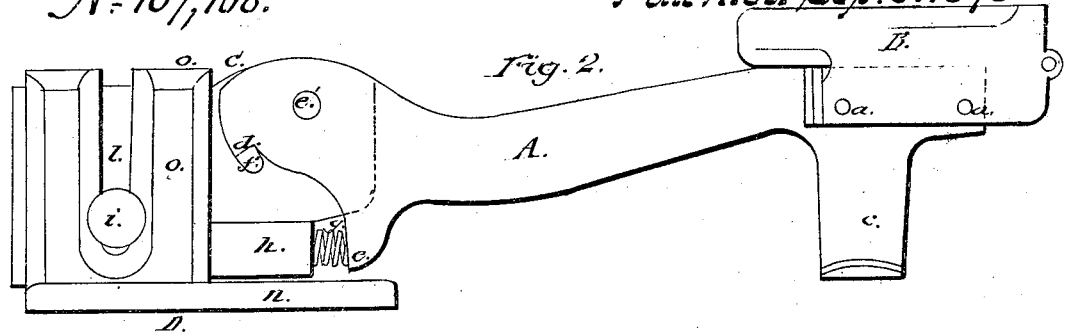
Figure 2 is an under-side or bottom view.
Figure 1:
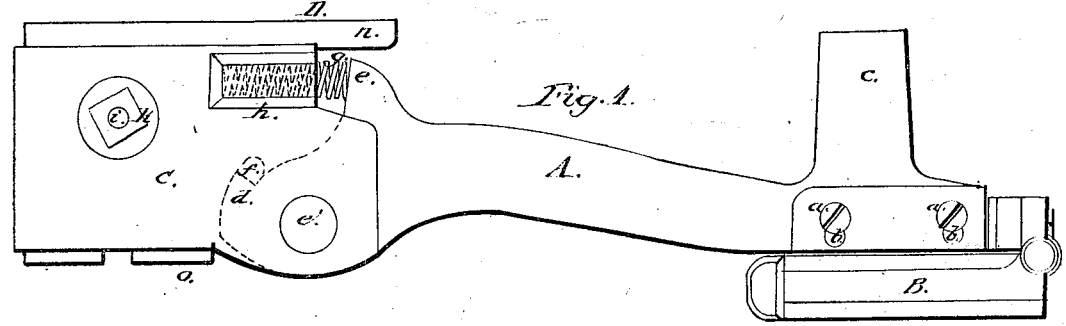
Figure 1 is a top view.
Figure 3:
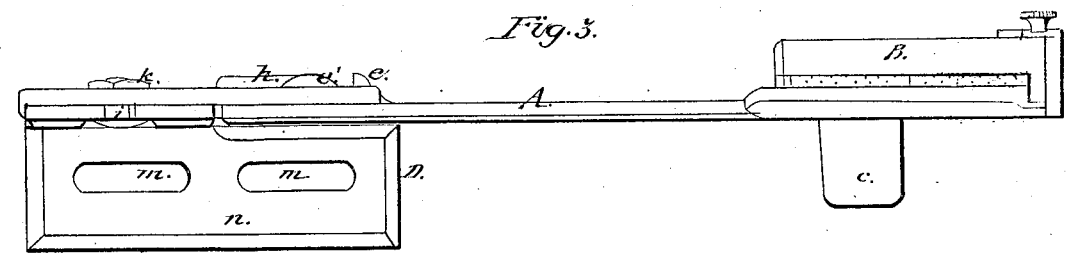
Figure 3 is an inner side elevation of such temple.
Figure 4:
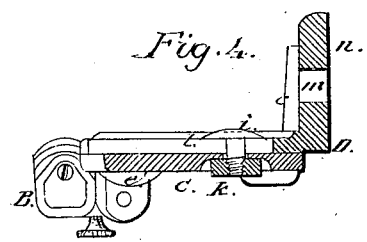
Figure 4 is a transverse section, taken through the clamp-screw and nut by which the temple-arm carrier is held to the adjustable bracket, to be hereinafter described.

The temple in question is what is usually termed a "reciprocating roller temple," it being somewhat analogous to the temple, shown in figs. 1 and 2 of the drawing of the United States Patent No. 9,502, granted to Elihu Dutcher and myself on the 28th day of December, A. D. 1852, and subsequently extended for a term of seven years beyond the original term of fourteen years.

In the patented temple, the arm was constructed in two pieces or bars, like the radius and humerus of a human arm, pivoted together and having a spring at the pivot.

The toothed roller case was fixed to the free end of one of such bars and there extended from the other at a right angle with it or therabout, a slotted projection.

This construction of the temple is objectionable for use in various looms, as it requires the temple to be supported on the top of the breast-beam of the loom, and causes it to be in the way, not only of the attendant of the loom, but of the application of certain "stop-motions."

It is very desirable to have a swinging arm temple applicable to the inner side of the breast-beam, in order not only to avoid the inconveniences and objections incident to the slide temple, but to get it mostly beneath the cloth, and enable it to be easily adjusted so as to bring the roller and its case into their correct relation with the cloth and lay.

My new or improved temple, which I shall now proceed to describe, has these necessary qualifications to an eminent degree, and, besides, combines therewith those of great durability, as well as of ease in operation.

In making the said improved temple, I have entirely dispensed with one of the bars of the temple arm, employing but one bar, A, for such arm, the temple roller case B being connected to such arms by means of screws $a$ $a$ going through slots $b$ $b$ in the arm.

The projection for the lay to beat against is shown at $c$ as extended from the arm A.

The said arm A at its rear end is flat, and provided with two stops or shoulders $d$ $e$, arranged as represented in fig. 2, the arm near one of such shoulders, viz.: that marked $d$ being pivoted to a carrier or plate, C, by a screw or pivot, $e'$, going through both the arm and the carrier.

The said carrier has a stop, $f$, projected from it for the shoulder $d$ to abut against.

A helical spring, $g$, arranged in a socketed part, $h$, of the carrier, bears at one end against the shoulder $e$.

Furthermore, the carrier C so made and applied to the arm A is supported in a bracket, D, and is connected thereto by a screw, $i$, and a nut, $k$, the screw going through a slot, $l$, formed in the bracket, and arranged therein at a right angle with two other slots, $m$ $m$, made in the vertical plate $n$ of the bracket.

The said bracket may be said to be composed of a horizontal plate, $o$, and a vertical plate, $n$, arranged at a right angle to each other, and united at one edge of each, the whole being as represented in the drawing.

In fixing the temple to a breast beam of a loom, the vertical part $n$ of the bracket is to be arranged against the inner side of such breast-beam, and be held thereto by screw-bolts going through the slots $m$ $m$.

From the above it will be seen that by the peculiar construction, arrangement, and connection of the parts of the improved temple, and the mode described of applying and fixing it to the breast-beam, it is rendered capable of adjustment, both lengthwise and laterally of the loom, so as to bring the temple roller case to its proper situation for receiving the cloth, which will be free to pass entirely over the temple-arm.

No part of the improved temple is liable, by the lay, to be forced back against an attendant, or to come in the way of the stop-motion.

I claim as my invention—

The adjustable bracket D, the temple arm carrier C, the clamp-nut $k$, and screw $i$, the pivoted temple arm A, the stops $d$ $e$ $f$, and spring $g$, all constructed and arranged as hereinbefore described.

WARREN W. DUTCHER.

Witnesses:
R. H. EDDY,
J. R. SNOW.